Oct. 16, 1962  F. R. GRUNER  3,058,593
TOW FLOW RATE FILTER
Filed March 1, 1960

FREDERICK R. GRUNER
INVENTOR.

BY
Lawrence J. Winter
ATTORNEY

United States Patent Office 3,058,593
Patented Oct. 16, 1962

3,058,593
TWO FLOW RATE FILTER
Frederick R. Gruner, Westfield, N.J., assignor to Purolator Products, Inc., Rahway, N.J., a corporation of Delaware
Filed Mar. 1, 1960, Ser. No. 12,078
2 Claims. (Cl. 210—493)

The present invention relates to a filter, and more particularly, to a filter having two distinct or separate flow rates.

The present invention provides a pleated paper filter element in which a plurality of convolutions or pleats are formed into an annulus and have the opposite edges thereof bonded to end caps or discs. The object of the convolutions or pleats is to increase the surface area of the filter element without increasing the space or area the filter occupies.

The filter element is further constructed to be of sufficient porosity so that the filter element will permit sufficient oil to pass through it for proper lubrication of an internal combustion engine under various conditions. This is accomplished by providing the surface area with two different porosities, namely a tight pore section and a freer pore section. During cold starting of an engine when the oil is heavy or viscous, the tight porosity surface area of the filter will restrict the flow of oil through it so that the major portion of the oil will flow through the freer porosity area of the filter paper. When the oil has sufficiently heated to reduce its viscosity, a greater portion of the oil than before will flow through the more restricted tight porosity section of the filter element while the remaining portion of the oil flowed through the filter element will pass through the freer porosity section or the fast flow rate area of the filter. Eventually, all of the oil being circulated through the filter element will be progressively filtered through the tight pore section to produce a finer filtration of the oil and removal of dirt and contaminants carried in it.

It is an object of the present invention to provide a pleated paper filter element provided with low and high flow rate filter sections therein which will operate efficiently under all engine conditions and which pleats have impressed in them a plurality of parallel drainage passages, grooves or serrations which will extend generally in radial directions after the filter annulus has been formed. These drainage passages prevent adjacent folds of pleats from coming in substantial contact with each other to block off flow of oil through the filter, or to prevent "pinch off" between adjacent pleat folds.

It is another object of the present invention to provide a novel pleated paper filter element having two separate flow rate areas therein with drainage passages formed in the pleats to prevent block off of the flow of oil through the filter element, in which the drainage passages are provided and the paper is compressed to form separate flow rate areas in a single operation during the manufacture thereof. The paper is provided with the drainage passages and is compressed or densified to provide filtration areas of different porosity in a single operation, by the use of cooperating mechanical means during the general manufacturing operations used for other type filters, in which conventional equipment is used, but with a minor modification thereof in carrying out the present invention.

Other objects and advantages of the present invention will be readily apparent from the following description when considered in connection with the accompanying drawing forming a part thereof, and in which.

Figure 1:
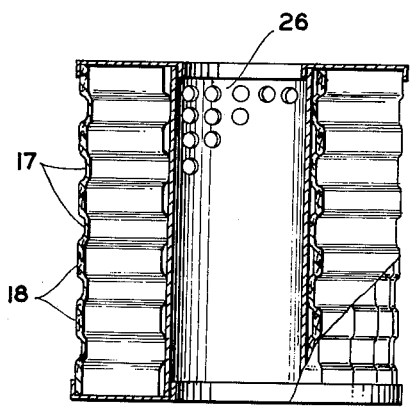
FIG. 1 is a side elevation partly broken away, of the filter element embodied in the present invention.

Referring to the drawings, the reference numeral 10 designates a roll or spool of resin impregnated filter paper having a uniform porosity of 25 micron size disposed on a support 11. The paper is unraveled from the roll and fed between a pair of cooperative roller bars 12 and 13 having the configuration illustrated in FIG. 6. Roller bar 13 is also provided with enlarged spaced cylindrical sections 15 having a larger diameter than the cylindrical sections 14. Roller bars 12 and 13 are positioned so that the cylindrical sections 14 of bar 12 are out of alignment with the cylindrical sections 15 of bar 13. The cylindrical sections 14 and 15 are adapted to cooperate with one another so that the peripheries thereof project slightly within the space between two adjacent cylindrical sections on the other roller bar. The lengths of these sections are also less than the length of the space to permit a width of the paper to fit therein without rupture, as illustrated in FIG. 6.

When the flat sheet filter paper is passed between the cooperating roller bars, alternate or spaced extensive areas of the paper are compressed or densified to form a continuous strip of filter paper having an area 17 of high porosity to form a tight pore size filter paper preferably having an average porosity of five to ten micron size, the clearance between roller bar 12 and sections 15 being predetermined. The clearance between cylindrical sections 14 and roller bar 13 is also set or predetermined so that the portion of paper passing directly below cylindrical sections 14 maintains its original density or porosity, preferably of twenty-five micron size, and comprises the high flow rate area 18 of the filter paper or the freer pore size portion of the filter element. Enlarged cylindrical sections and the cooperating roller bars are positioned so that the horizontal plane of the tight pore size area 17 is out of alignment with a parallel plane passing through the freer pore size area 18 of the filter paper in order to provide drainage passages 19 defined by the area 18 and the adjacent vertical portions of paper designated 20 which join area 18 to area 17. It will thus be noted that the present invention compresses to reduce porosity and grooves to provide discharge passages 19 in a simultaneous operation. If desired, more than one cooperating set of roller bars for progressive compression and the forming of discharge passages for the pleats of paper may be employed to prevent any rupture or tearing of the paper during manufacture thereof.

Figure 6:
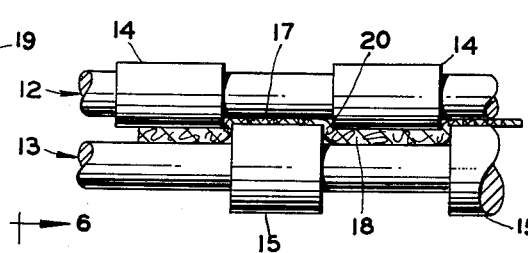
FIG. 6 is an enlarged fragmentary detail view of the rollers taken along line 6—6 of FIG. 5.
Figure 5:
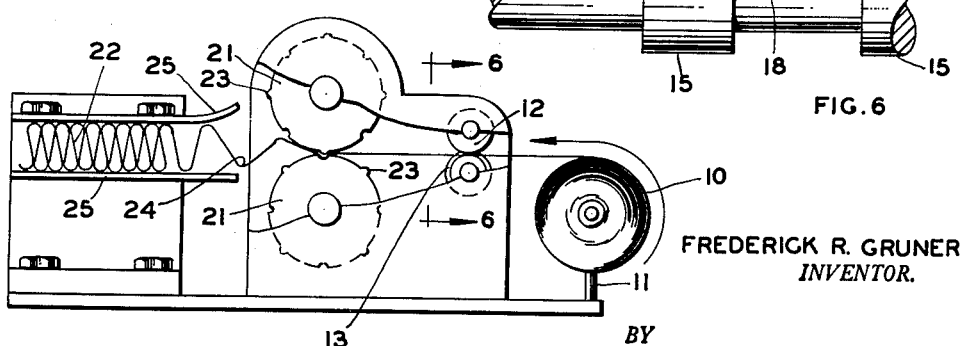
FIG. 5 is a diagrammatic view illustrating the method of compressing and forming discharge passages for the pleats of the filter element in a single operation.

After the paper has passed between the roller bars and is formed into the transverse cross section shown in FIG. 6, the paper is then passed between a set of convoluting or pleating rollers or drums 21 which convert the straight sheet of paper into a continuous series of pleats 22. This is accomplished by the scoring blades 23 which are mounted in members 21 to extend longitudinally thereof and project a slight distance from the curved outer surface of the rolls. When the sheet of paper is advanced between these rolls, it will be periodically scored or creased to provide fold lines 24 in it. As the paper is progressively fed between the lateral friction plates 25, the restricted space between the plates slow down the speed of the strip of paper and cause it to bend back and further along its creased or scored lines, as shown in FIG. 5, to form the uniform pleats 22 illustrated therein. The pleated paper is then cured in a conventional oven not shown, cut into predetermined lengths having a predetermined number of pleats therein, and is formed into an annulus after which the free ends are joined together and the annulus is inserted around a perforated metal center tube 26. Thereafter, annular end caps which may be made of metal or paper are bonded to the opposite ends of the filter pleats, resulting in the filter cartridge shown in FIG. 1, with the pleats arranged as illustrated in FIG. 2.

Figure 2:
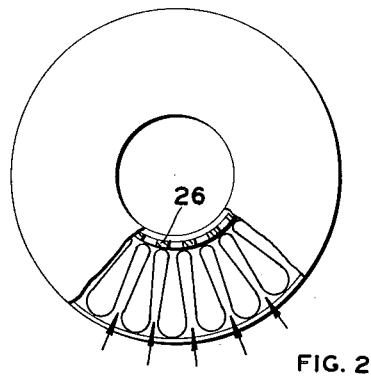
FIG. 2 is a top plan view of the filter element partly broken away to show the arrangement of the paper pleats before a liquid is flowed through the filter element.

It will be noted that the adjacent pleats shown in FIG. 2 are spaced slightly apart from each other so that when liquid is flowed in a radial inwardly direction, as indicated by the arrows in FIG. 2, it will pass through the pleats and deposit any contaminant on the outside thereof, and will be discharged from the inside of the pleats through the perforations in center tube 26.

When the oil passed through the filter is relatively viscous, such as upon cold starting of an engine, the majority of the oil flowing will pass through the freer porosity area 18 of the filter since the tighter porosity area 17 will offer a much higher resistance to flow due to its tighter porosity and the high viscosity of the oil.

When the engine oil has warmed up, a greater portion of it will then pass through the tight porosity area 17 of the filter than before, since the viscosity of the oil and hence its resistance to flow has been reduced. Eventually, all of the oil which has by-passed the tight porosity area 17 due to high viscosity, will be progressively filtered through the finer filter area 17 so that the present invention will always give complete filtration no matter what the conditions are, and very fine filtration upon normal conditions of operation.

Figure 4:
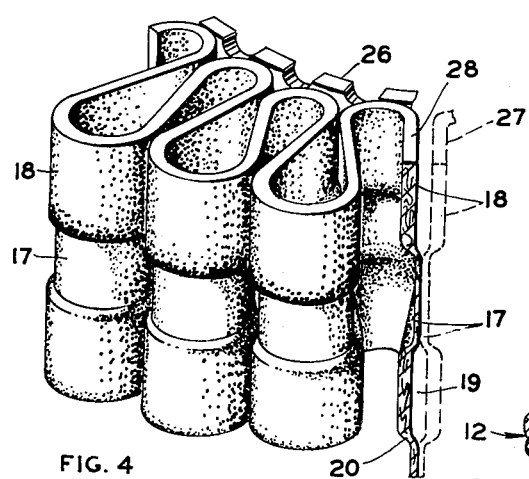
FIG. 4 is an enlarged fragmentary detail view illustrating the grooving forming the discharge passage arrangement in the two flow rate filter element of the present invention.
Figure 3:
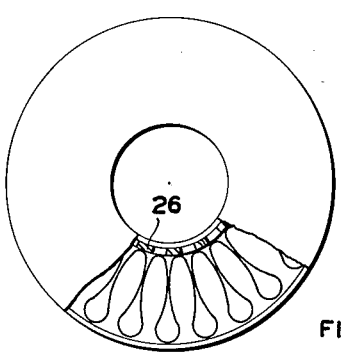
FIG. 3 is a view similar to FIG. 2, illustrating the position the pleats tend to take when a liquid under pressure is flowing through the filter.

During flow of oil through the filter under pressure, since the pleats are closely spaced to provide a maximum area of filtration and are also made of resin impregnated paper, there is a tendency for radial inwardly flow of the oil to squeeze or compress the sidewalls 27 and 28 of a pleat together so that oil passing from the outside of a pleat will be blocked after it passes to the inner side of the pleat, and be prevented from being discharged into the center tube. This is known as "pinch off" and comes from the tendency of the pleats pinching together, as illustrated in FIG. 3 in an exaggerated manner. However, in the present invention, pinch off is avoided by the discharge passages 19 formed in the pleats adjacent the freer porosity area 18, by area 18 being formed so that its horizontal plane is out of alignment with the horizontal plane passing through the tight porosity area 17. Referring to FIG. 4, it can be clearly seen that the discharge passages 19 prevent the sidewalls 27 and 28 from coming in complete contact with each other since if the tighter porosity areas 17 are ever pinched together so as to come in substantial contact with each other, they are still out of alignment with the freer porosity areas 18, and discharge passages 19 will permit oil passed through sections 18 to flow through drainage passages 19 so as to discharge into the center tube.

It is thus apparent that the present invention has provided a two flow rate filter element made from resin impregnated pleated paper in which the paper is compressed to form different flow rates therein and discharge passages therein to prevent pinch off from a single operation during the manufacture thereof.

Inasmuch as various changes may be made in the particular form and arrangement of the article and in the steps of the method and other sequences as disclosed without departing from the principles of the invention, it will be understood that the invention is not to be limited except by the scope of the appended claims.

What is claimed is:

1. A method for making a multi-pass filter having drainage passages comprising compressing a strip of filter paper along transversely interspaced areas of substantial width and extending the length of the strip while bending the junctions of said areas with the strip so as to displace said areas into planes projecting from the strip and substantially parallel therewith, pleating said strip, and forming and securing the pleated strip into a cylindrical configuration with said areas projecting inwardly so as to intercontact when the inwardly facing surfaces of the walls of said pleats are pressed inwardly towards each other, said areas being compressed to have a reduced porosity as compared to that of the balance of the strip and serving to interspace this balance when said surfaces are pressed inwardly.

2. A multi-pass filter comprising a strip of filter paper formed into pleats and in pleated form formed into cylindrical configuration and having means for sealing the ends of said pleats so that fluid may be passed radially inwardly through said configuration for filtering through said paper, said strip having transversely interspaced areas of substantial widths extending longitudinally thereof and radially with respect to said configuration and projecting from said strip substantially parallel therewith inwardly with respect to said configuration, said areas having a lower porosity than the balance of said strip and intercontracting when the inner surfaces of the walls of said pleats are pinched together by fluid flowing therethrough and thus interspacing the balance of said surfaces, whereby said filter provides separate filtering passes of different porosities formed by said areas and the balance of said strip respectively and drainage areas formed by the spaces between the balance of said strip formed when said areas intercontract when said surfaces are pinched together.

References Cited in the file of this patent

UNITED STATES PATENTS

| | | |
|---|---|---|
| 2,321,985 | Briggs | June 15, 1943 |
| 2,395,449 | Briggs | Feb. 26, 1946 |
| 2,569,243 | Kovacs | Sept. 25, 1951 |
| 2,675,127 | Layte | Apr. 13, 1954 |
| 2,801,009 | Bowers | July 30, 1957 |

FOREIGN PATENTS

| | | |
|---|---|---|
| 725,066 | Great Britain | Mar. 2, 1955 |